US008813184B2

(12) United States Patent
Hirose

(10) Patent No.: US 8,813,184 B2
(45) Date of Patent: Aug. 19, 2014

(54) AUTHENTICATION USING MOBILE DEVICES

(75) Inventor: Haruto Hirose, Yokohama (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/260,154

(22) PCT Filed: Feb. 24, 2011

(86) PCT No.: PCT/US2011/026123
§ 371 (c)(1),
(2), (4) Date: Sep. 23, 2011

(87) PCT Pub. No.: WO2012/115651
PCT Pub. Date: Aug. 30, 2012

(65) Prior Publication Data
US 2012/0222102 A1 Aug. 30, 2012

(51) Int. Cl.
G06F 17/30 (2006.01)
G06F 21/00 (2013.01)
H04K 1/00 (2006.01)

(52) U.S. Cl.
USPC .......... 726/2; 726/4; 726/7; 726/27; 713/184; 713/186; 380/247

(58) Field of Classification Search
USPC .......... 726/7, 2, 4, 27; 713/184, 186; 380/247
See application file for complete search history.

(56) References Cited

U.S. PATENT DOCUMENTS

| 7,929,728 | B2 | 4/2011 | Guo et al. | |
| 7,941,832 | B2 | 5/2011 | Tsutsui et al. | |
| 8,151,111 | B2 | 4/2012 | Uneda et al. | |
| 8,207,834 | B2 | 6/2012 | Takemura et al. | |
| 2003/0159040 | A1* | 8/2003 | Hashimoto et al. | 713/168 |
| 2005/0093868 | A1* | 5/2005 | Hinckley | 345/502 |
| 2006/0182318 | A1* | 8/2006 | Shigeta | 382/124 |
| 2007/0103746 | A1* | 5/2007 | Molteni | 359/7 |
| 2008/0120071 | A1 | 5/2008 | Minatogawa et al. | |
| 2008/0175377 | A1 | 7/2008 | Merrill | |
| 2008/0256360 | A1* | 10/2008 | Guzman et al. | 713/176 |
| 2010/0005691 | A1 | 1/2010 | Ballas et al. | |

(Continued)

FOREIGN PATENT DOCUMENTS

JP 2001-331450 A 11/2001

(Continued)

OTHER PUBLICATIONS

Thirumaran et al., Segment and Split-Image Based Authentication Techniques for Mobile Devices, International Journal of Engineering and Technology, Dec. 2009, pp. 17-28, vol. 2, No. 4, Eashwar Publications.
International Search Report and Written Opinion from PCT/US2011/026123, Jul. 20, 2011, 12 pgs.

*Primary Examiner* — Mohammad W Reza
(74) *Attorney, Agent, or Firm* — Maschoff Brennan

(57) ABSTRACT

Technologies are generally described for authentication systems. In an example, an authentication system can be built among devices by sharing an image that is virtually torn into pieces. Each participant in the authentication system receives a piece of the image. The participants are authenticated when the pieces are later joined to form the original image.

19 Claims, 5 Drawing Sheets

(56) References Cited

U.S. PATENT DOCUMENTS

| | | |
|---|---|---|
| 2010/0017759 A1 | 1/2010 | Birnbaum et al. |
| 2010/0053691 A1 | 3/2010 | Kuyper-Hammond et al. |
| 2010/0082990 A1* | 4/2010 | Grigorovitch ............... 713/176 |
| 2012/0087538 A1* | 4/2012 | Cvetkovic et al. ............ 382/100 |
| 2013/0243340 A1 | 9/2013 | Hirose |

FOREIGN PATENT DOCUMENTS

| | | |
|---|---|---|
| JP | 2003-032247 A | 1/2003 |
| JP | 2007-213406 A | 8/2007 |
| JP | 2007-304792 A | 11/2007 |
| JP | 2007-310691 A | 11/2007 |
| WO | 2010/009145 A1 | 1/2010 |

* cited by examiner

AUTHENTICATION USING MOBILE DEVICES

The present application is a U.S. National Stage of International Application No. PCT/US2011/026123, filed on Feb. 24, 2011.

BACKGROUND

Authentication generally refers to the process of establishing an identity of an individual or more generally to a process of establishing a claim that something is true. The type of authentication required in any given situation can vary widely. Many situations may require strict and multi-faceted authentication while other situations have less stringent authentication requirements.

There are various factors that can be used to establish identity or to establish that something is what it claims to be. Common factors used during authentication include ownership, knowledge, and inherency factors. Ownership factors often refer to something that a user possesses, such as a card or a token. Knowledge factors refer to something that is known to the user, such as a password. Inherency factors often relate to something about the user, such as a fingerprint or a retinal pattern.

While it may be desirable to establish an authentication process that requires at least two of these factors, this may not always be possible or practical. Many websites, for instance, rely on knowledge factors alone to authenticate users, although some websites use other factors in their authentication processes.

For example, a website may offer users the ability to establish accounts with the website. When an account is initially established, the user may be asked to provide sensitive or private information (e.g., date of birth, credit card number, etc.). This information may be stored by the website in the user's account.

One of the steps performed in establishing the account is the selection of a username and a password, which are an example of knowledge factors. Future access to the account is governed by the username/password combination.

When access to the account is requested, the website must ensure that the user attempting to access the account is, in fact, the authorized user of the account. When the user provides the correct username and password associated with his or her account, the user is authenticated and the website provides access to the account.

There are other situations where ownership factors are used for authentication purposes. Ticketing systems, for instance, often use bar-codes when selling tickets to an event as well as when checking tickets at the event. In this sense, the possession of a ticket with a valid bar-code authenticates the user as having a valid ticket to enter the event. Biometric authentication, which is an example of inherent factors, may be used in ATMs and other mission-critical systems.

Authentication may also be required when entering a building or other area where access is controlled. Access to restricted areas, for instance, is often controlled using some type of authentication. In some instances, a third party is often needed to record the authentication conducted by an authentication system. The foregoing examples illustrate that authentication systems are not limited to online scenarios.

One drawback of conventional authentication schemes is that many devices are not equipped with the proper equipment. Many devices simply do not have the capability, for example, to obtain a retinal scan or read a bar-code. As a result, many authentication systems have little applicability outside of a specific system. An authentication system for systems and services used around the world is not worth the cost if it is only installed in some devices.

SUMMARY

Embodiments relate to authenticating participants in an authentication system. In one example, a method for authenticating users includes acquiring an image in a first device associated with a first user, sharing at least a portion of the image with a second device associated with a second user, virtually tearing the image into at least a first piece and a second piece, where the first piece of the image is stored in the first device and the second piece of the image is stored in the second device, and authenticating the first device and the second device when the first piece and the second piece of the image are joined to form the image.

In another example, a device for authenticating participants in an authentication system includes an imaging component and an authentication component. The imaging component is configured to obtain an image, which may be stored in a memory of the device. The authentication component is configured to share the image with at least one other device and virtually tear the image into one or more pieces in conjunction with the at least one other device. Each device retains a piece of the image after the image is virtually torn into the one or more pieces.

In still another example, a system for enabling authentication for participants in an authentication process includes a server configured to communicate with multiple participants. The server includes an authentication component configured to determine load values from load conditions at each participant in the authentication process. The load values are used to virtually tear an image into multiple pieces and each participant in the authentication system retains a piece of the image. The authentication system is also configured to integrate pieces of the image uploaded by the participants to authenticate the participants when the pieces can be joined to form the image.

In yet another example, a device for participating in an authentication system includes an authentication component configured to interact with corresponding authentication components on other devices and/or servers to build the authentication system. The authentication component include an imaging mechanism configured to acquire an image, a communication mechanism configured to establish communication with the other devices and/or servers, a load mechanism configured to determine a load value for the device, a tearing mechanism configured to virtually tear the image based on the load value into multiple pieces, and a distribution mechanism configured to distribute one of the multiple pieces of the image to each of the other devices participating in the authentication system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
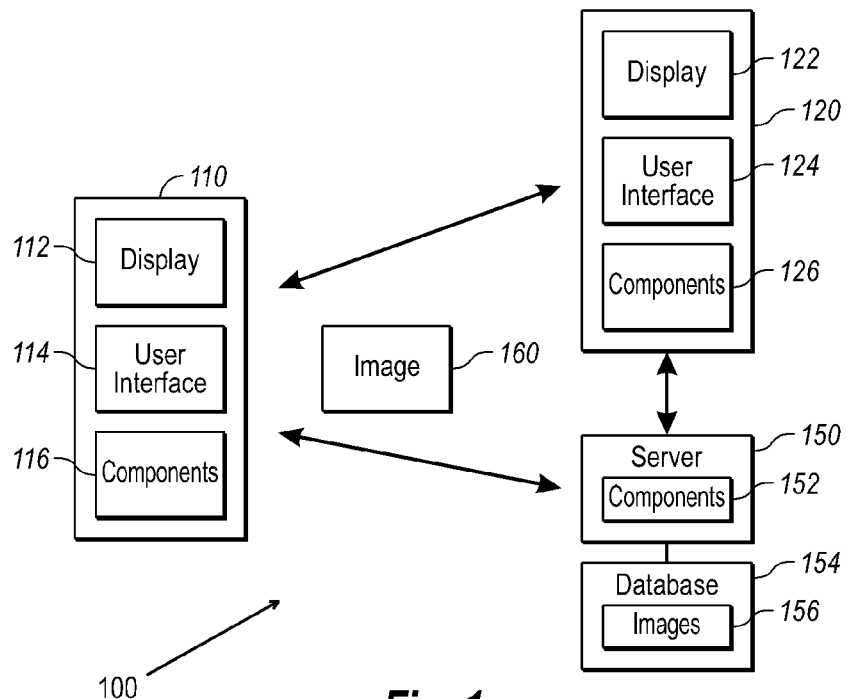
FIG. 1 shows an illustrative example of a system for implementing authentication.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments disclosed herein relate generally to authentication. Embodiments of the authentication systems and methods disclosed herein often begin by constructing or building an authentication system or process. Although the following discussion discusses authentication in the context of devices, one of skill in the art can appreciate that authentication, as disclosed herein, can also be performed for the devices, users associated with the devices, members of a group, other objects, or the like, or any combination thereof.

The construction of the authentication system may use an image that is virtually torn into multiple pieces. More specifically, the image is shared with the devices participating in the authentication system. Once the image is entangled with the devices participating in the authentication system, the devices virtually tear the image. The resulting pieces are then distributed to the participating devices. As a result, the devices (or users of the devices such as members of a group or other objects) participating in the authentication system each receive a piece of the virtually torn image.

Authentication of the devices can be performed at a later time when the devices are again brought together using the authentication system that was previously constructed, although embodiments contemplate instances where the devices are not physically close. The pieces of the image distributed during construction of the authentication system can be collected from the devices and joined. If the pieces can be successfully joined to form the original image, then the devices are authenticated.

It may be possible to authenticate only some of the devices. For instance, some of the pieces may be joined to form part of the original image while other pieces may not fit or be present. The users or devices associated with the joined pieces can be authenticated while the users or devices whose pieces do not fit or are not present are not authenticated.

The authentication systems and/or methods disclosed herein are not limited specifically to devices and/or their associated users. Objects that are not specifically associated with a user can also participate in the authentication process. Thus, the authentication systems and/or methods for authentication disclosed herein enable devices, users and/or other objects to mutually authenticate each other.

For example, a gate may be able to participate in the authentication process along with one or more users of the gate. The participants in the authentication process thus include the gate and the users of the gate. The gate may receive a piece of the image just like the users. As a result, entry through the gate is only permitted when at least some of the participants, including the gate, are authenticated. For example, an authentication process that includes a gate may be able to authenticate one user at a time even though multiple users may have participated in the authentication process. The ability to authenticate devices, users, supervisors, objects (e.g., doors, gates, etc.), or the like, or combinations thereof can improve risk management and reduce complexity of the authentication process.

FIG. 1 shows an illustrative example of a system 100 for implementing authentication. The system 100 includes a server 150 that can communicate with multiple devices including a device 110 and a device 120. The device 110 may also be able to communicate with the device 120 without communicating with the server 150. The communication between the device 110, the device 120, and/or the server 150 can occur over one or more networks (wired and/or wireless) using various protocols. The authentication process disclosed herein can occur exclusively between the device 110 and the device 120. Alternatively, the server 150 may participate in the authentication process.

The device 110 includes, by way of example only, a display 112, a user interface 114, and components 116. The device 110 may also include a processor that is configured to interact with and/or control the components 116, the user interface 114, and/or the display 112.

The device 120 may be configured similarly to the device 110 and may include a display 122, a user interface 124, and components 126. The device 110 and the device 120 are representative of devices that can communicate over a network with the server 150. Examples of the devices 110 and 120 include, but are not limited to, cellular phones, smartphones, audio and/or video devices, laptop computers, notebook computers, tablet devices, or the like or any combination thereof. In some examples, participants in the authentication process may include other objects such as, by way of example only, doors, gates, access barriers, or the like.

The display 112 and the user interface 114 may be integrated in some examples. The display 112 and user interface 114 may be integrated as a touch input enabled display. The user interface 114 can include any combination of visual elements, tactile elements, and/or aural elements. The user interface 114 can be used to input information to the device 110 as well as to present data to a user visually, aurally, and/or tactilely.

The components 116 may include hardware, software, and/or firmware components. The components 116, as described in more detail below, can be used to perform authentication of the device 110 or of a user (e.g., a user of the device 110) or of a group of users (e.g., members of a group), or of an object or the like or any combination thereof. The components 116 often work together in the same device and/or with the components of another device and/or object to perform authentication. For example, the components 116 may cooperate with the components 126 and/or component 152 to build an authentication system and/or authenticate participants, such as the devices 110 and 120, in the authentication system.

The components 116 may include, for instance, one or more accelerometers, a global positioning system, one or more cameras, speakers, or the like or any combination thereof. The components 116 may also include modular components or mechanisms that are configured to operate to construct an authentication system and/or configured to authenticate a device with the authentication system as described in more detail below.

The system 100 also includes the server 150. The server 150 may also be involved in the authentication process. The server 150 can participate in the construction of the authentication system and/or in the authentication of the devices or users that participated in building the authentication system. The server 150 includes components 152 to perform at least some of the aspects of the authentication process described herein. The server 150 may include or have access to a database 154. The database 154 may store images 156 or other data used during the authentication disclosed herein.

For example, the authentication disclosed herein may involve an image 160 that is virtually torn into pieces. The image 160 can be generated by one of the devices 110 and 120 or retrieved from the images 156 in the database 154. The components 116, 126, and/or 152 cooperate to share the image 160 among the devices 110 and 120, virtually tear the image 160 into pieces, and then distribute the resulting pieces to the devices 110 and 120. During authentication, the components 116, 126, and/or 152 cooperate to collect the pieces and fit the pieces together. When the pieces are successfully joined, the devices 110 and 120 (and/or the users thereof) are authenticated.

The image 160 can be virtually torn by one or more of the devices 110 and 120 or by the server 150. Similarly, the pieces can be joined by one of the devices 110 and 120, or by the server 150.

The image 160 used in authenticating the devices 110 and 120 may be retrieved from the database 154 or otherwise generated by the server 150. For example, the database 154 may include images 156 that are already virtually torn and organized into sets of images. Each set may include an original image and groups of pieces. One group may include three pieces, another group may include four pieces, and the like. Thus, the database 154 may include a large number of images 156 that are each associated with unique pieces or groups of pieces. This ensures that when an image is requested and the number of participants is determined, the server 150 can return the correct set of pieces for the given circumstances.

Generally, an authentication process includes a part where an authentication system is built. In one example, the authentication system is built by the participants in the authentication process. However, the authentication system may also be built by a device or server that is not participating in or is only partially participating in the authentication process. For example, the server 150 may distribute pieces of the image 160 to the devices 110 and 120 without keeping a piece of the image 160 for itself. The devices 110 and 120 can then authenticate each other at a later time themselves or using the server 150.

Figure 2A:
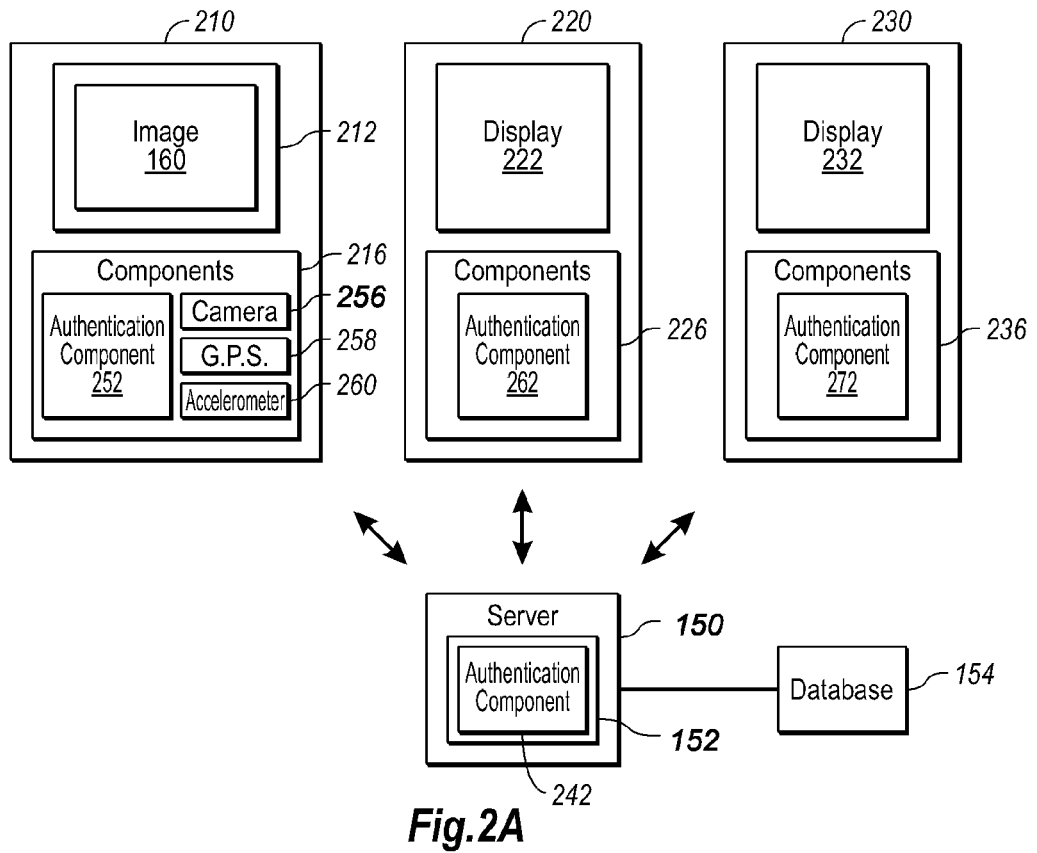
FIG. 2A shows an illustrative example of devices involved in an authentication process.
Figure 2B:
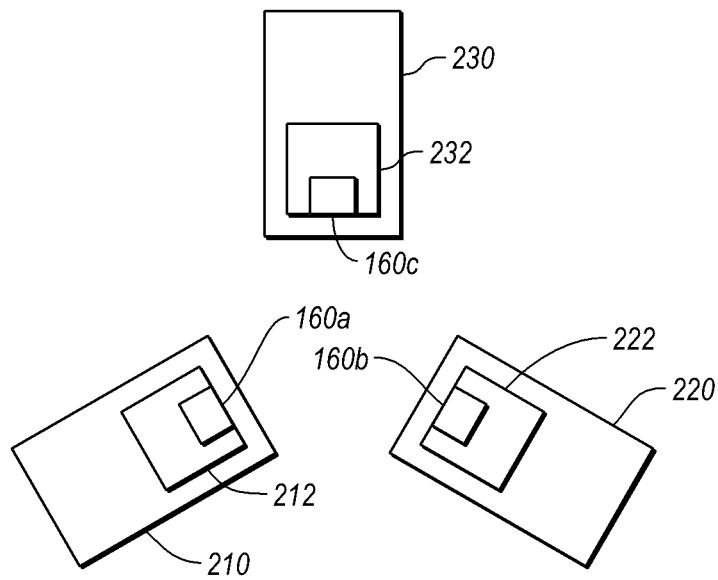
FIG. 2B shows an illustrative example of devices sharing an image during the authentication process.
Figure 2C:
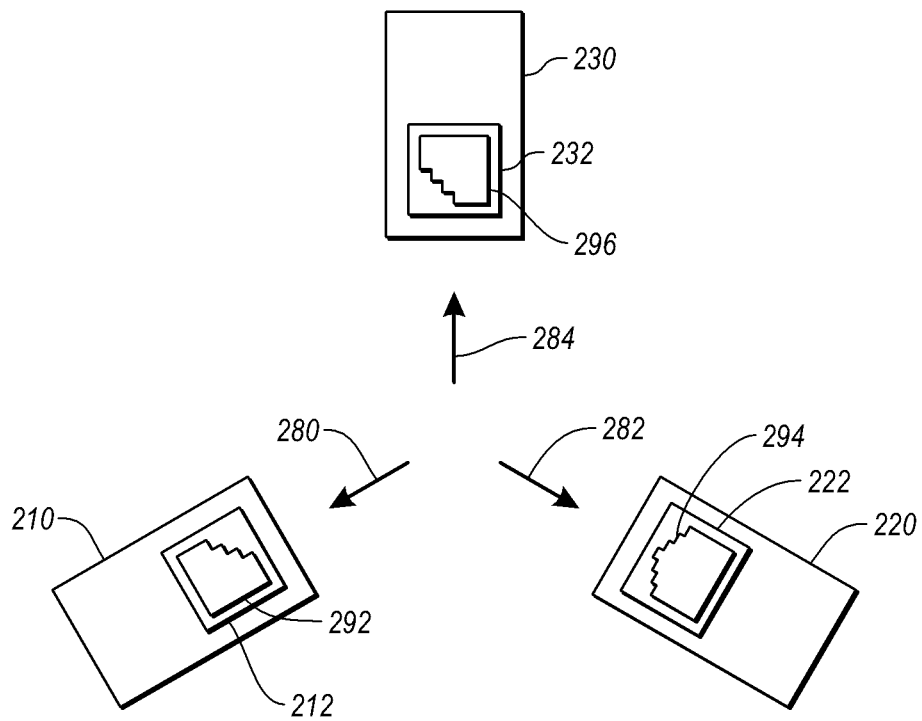
FIG. 2C shows an illustrative example of the image being virtually torn during the authentication process.
Figure 2D:
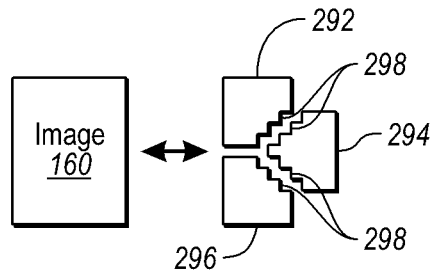
FIG. 2D shows an illustrative example of authenticating the devices that participated in the authentication process.

Another part of the authentication process involves authenticating the devices and/or users that participated in building the authentication system. FIGS. 2A, 2B, 2C show an illustrative example of devices participating in the part of the authentication process that includes setting up the authentication system. FIG. 2D shows an illustrative example of the part of the authentication process that includes authenticating the devices.

FIG. 2A shows an illustrative example of devices involved in an authentication process. FIG. 2A illustrates a device 210, a device 220, and a device 230, which are each examples of the device 110 or the device 120. Each of the devices 210, 220, and 230 is associated with a different user in this example.

The device 210 includes components 216 that are used during the authentication process. The components 216 are an example of the components 116. The components 216 include, by way of example only, an authentication component 252, a camera 256, a GPS component 258, and an accelerometer 260. The devices 220 and 230 may be similarly configured, respectively, with components 226 and 236.

As discussed in more detail below, the authentication performed by the devices 210, 220, and 230 involves the image 160. Generally, after the image 160 is acquired by the device 210, the image 160 is shared with the devices 220 and 230. Once the image 160 is shared, the image 160 is virtually torn into, in this example, three pieces—a piece for each of the devices 210, 220, and 230. Each of the devices 210, 220, and 230 retains or receives one of the pieces of the image 160.

More specifically, constructing the authentication system may begin when the device 210 acquires the image 160. The image 160 can be acquired via the camera 256 or retrieved from the database 154 via the server 150.

At a later time, the devices 210, 220, and 230 or users of the devices 210, 220, and 230 can be authenticated when their individual pieces can be rejoined to form the original image 160.

FIG. 2B shows an illustrative example of devices sharing the image 160 during the authentication process. After the image 160 has been acquired by the device 210, the image 160 is shared with the devices 220 and 230. In this example, at least a portion of the image 160 is shared with the other devices 220 and 230. As a result, a portion 160a of the image 160 is displayed on the display 212, a portion 160b is displayed on the display 222 of the device 220, and a portion 160c of the image 160 is displayed on the display 232 of the device 230.

The devices 210, 220, and 230 may receive a complete copy of the image 160. In some examples, the entire image 160 may be displayed by each of the devices 210, 220, and 230. Once the image 160 is virtually torn, however, the respective authentication components 252, 262, and 272 delete data related to sharing the image 160. Once the authentication system is constructed, the devices 210, 220, and 230 each retain a piece of the image 160 such that the devices 210, 220, and 230 cannot independently reconstruct the image 160.

In one example, only portions 160a, 160b, and 160c of the image 160 (the portions may not correspond to the pieces ultimately received by the devices) are displayed and the devices 220 and 230 never receive a complete copy of the image 160 in one example. By sharing the image 160 or portions of the image 160 among the devices 210, 220, and 230, the image 160 becomes virtually entangled amongst the devices 210, 220, and 230.

Once the image 160 is shared amongst the devices 210, 220, and 230, the image 160 is virtually torn into pieces. The devices 210, 220, and 230 may be communicating when the image 160 is virtually torn, although the communication between the devices 210, 220, and 230 may terminate prior to virtually tearing the image 160. The image 160 can be virtually torn when the devices 210, 220, and 230 are moved away from an initial position, which can be arbitrarily determined. As shown in FIG. 2B, the devices 210, 220, and 230 may be brought into relatively close proximity to each other prior to virtually tearing the image 160. Virtually tearing the image 160 can be accomplished in different ways. While the movement of the devices 210, 220, and 230 simulates tearing the image 160, the underlying image 160 and resulting pieces can be generated in different ways.

In one example, an image can be torn into a certain number of pieces. The original image and the pieces of the image can then be compiled into sets of images and stored in the database 154 as the images 156. In one example, the database 154 stores thousands of sets of such images that can be used upon request by the devices constructing the authentication system.

In another example, a computer simulation of tearing a metal, plastic, or paper object (or other object) when the object is subjected to certain loads may be performed. The simulation results can be stored in the database 154 and used upon request by the devices constructing the authentication system. Thus, the images 156 may also include images and/or pieces of images that are generated from the simulation results.

In this example, load conditions at the devices 210, 220, and 230, as determined from the accelerometers and/or GPS sensors, can be used as input to the database 154 to retrieve an image set (e.g., pieces of an image) associated with the image 160.

In another example, a piece of paper or other object may be perforated into N×N or N×M pieces (e.g., squares or rectangles). Random simulations of how the perforations are cut or torn can be performed when the paper is pulled at various load points. The simulations tear the simulated paper or object such that the simulated paper or object is torn occur along the perforations. As a result, the simulations generate pieces with edges that are associated with the perforations. The various edges of the pieces are straighter and can be assumed, in one example, to be straight.

This may be beneficial when joining the pieces during authentication because they can be processed more quickly. In other words, pieces that have relatively straight or straight edges may require less processing to join together during authentication. The results of the simulations provide image sets that can be used upon request.

FIG. 2C shows an illustrative example of the image 160 being virtually torn. As the devices 210, 220, and 230 are moved (e.g., away from each other), the authentication components 252, 262, and 272 use information collected or provided by other components (e.g., the accelerometers and GPS sensors of the respective devices) to determine the load conditions, which are used to determine load values 280, 282, and 284, respectively, at each of the devices 210, 220, and 230. The movement of the devices 210, 220, and 230 need not be in the same plane. In addition, each of the devices 210, 220, and 230 can be moved in multiple planes or dimensions. The load values of each of the devices 210, 220, and 230 determine how the image 160 is virtually torn. FIG. 2C thus shows the load values 280, 282, and 284 that are associated, respectively, with the devices 210, 220, and 230.

Virtually tearing the image 160 can begin in various ways. In one example, the displays of the devices 210, 220, and 230 may provide instructions to virtually tear the image 160. When this command is displayed (or based on other indicia or by agreement among the users), the load conditions associated with the load values 280, 282, and 284 are captured by the authentication components 252, 262, and 272. The load values 280, 282, and 284 are therefore based on data collected from the accelerometers and/or GPS sensors of the devices 210, 220, and 230. The load values 280, 282, and 284 are used to determine how the devices "pull" on the image 160 and thus virtually tear the image 160 into pieces 292, 294, and 296.

The load values 280, 282, and 284 can be delivered to the server 150. The server 150 may then access the database 154 to retrieve a set of pieces that correspond to or most nearly correspond to the received load values 280, 282, and 284. The set of pieces 292, 294, and 296 are then returned to the devices 210, 220, and 230. Alternatively, the server 150 and/or one of the devices 210, 220, and 230 can perform a simulation based on the load values 280, 282, and 284 to generate the pieces 292, 294, and 296.

More specifically, FIG. 2C illustrates that the image 160 is virtually torn into the piece 292, the piece 294, and the piece 296. The number of pieces resulting from the virtually tearing of the image 160 depends on the number of devices participating in the authentication process. In this example, each of the devices 210, 220, and 230 receives one of the pieces of the image. The device 210 receives the piece 292, the device 220 receives the piece 294, and the device 230 receives the piece 296. The pieces 292, 294, and 296 may be displayed in the respective displays 212, 222, and 232.

Once the devices 210, 220, and 230 have received the pieces 292, 294, and 296, respectively, the authentication components 252, 262, and 272 delete all data except for the pieces 292, 294, and 296, respectively, from the devices 210, 220, and 230. After the construction of the authentication system, the device 210 retains or stores the piece 292, the device 220 retains or stores the piece 294, and the device 230 retains or stores the piece 296.

FIG. 2D shows an illustrative example of authenticating the devices 210, 220, and 230 that participated in building the authentication system. In this part of the authentication process, each of the devices 210, 220, and 230 provides its corresponding piece of the image 160 to the server 150 or to one of the devices 210, 220, and 230. For example, the pieces 292, 294, and 296 may be uploaded to the server 150 by the devices 210, 220, and 230.

An authentication component 242 of the server 150 then integrates or joins the pieces 292, 294, and 296. If the authentication component 242 can join the pieces 292, 294, and 296 to generate the original image 160, then the devices 210, 220, and 230 are authenticated. In this example, the server 160 may keep track of which image was used during the construction of the authentication system in order to have a reference image for comparing the pieces 292, 294, and 296.

In one example, the authentication component 242 can evaluate the edges 298 to determine whether the image 160 can be formed from the pieces 292, 294, and 296. The image 160 can be formed (and the devices 210, 220, and 230 authenticated) when a degree of coincidence between the pieces 292, 294, and 296 is greater than a predetermined value in one example. In some examples, each of the pieces 292, 294, and 296 may include an orientation to facilitate integrating the pieces during authentication or to facilitate the determination of whether the pieces 292, 294, and 296 can be successfully joined.

The pieces 292, 294, and 296 can be joined by a trial and error process, which combines the edges of the various pieces. The pieces 292, 294, and 296 are considered to be successfully joined when the process of joining determines that the combination of the pieces reaches some threshold. In one example, the joined image can be compared to the original image. The degree to which the joined image matches the original image can be used to determine whether authentication is affirmative. In the extent to which the joined image matches the original image can be expressed as a matching rate or an image distance. The pieces 292, 294, and 296 result in authentication when the matching rate and/or the image distance is the same as and/or favorably comparable to a threshold value.

In another example, the joined image results in successful authentication when the curvature of the joined image favorably compares to a threshold curvature value. In this case, the edge 298 is compared with the original image and the joined image is authorized based on a tangent of a straight line or the curvature of the curve which is the value reflecting the joined image.

In another example, data generated during the process of virtually tearing the image is compared with a shape of the edge 298. Data generated when combining the edge 298 with the edge shape data can be used to authenticate.

FIGS. 2A-2D illustrate that an authentication system can be built and used by any group of users or devices. The authentication system can be also rebuilt using a different image at practically any time. A device can also participate in multiple authentication systems using different images or even using the same image (which will typically be virtually torn in a different manner due to different load values). In addition, the authentication system built as disclosed herein can operate as a one-time password. The authentication systems and methods disclosed herein can be widely distributed and used in a variety of different scenarios and contexts.

Figure 3:
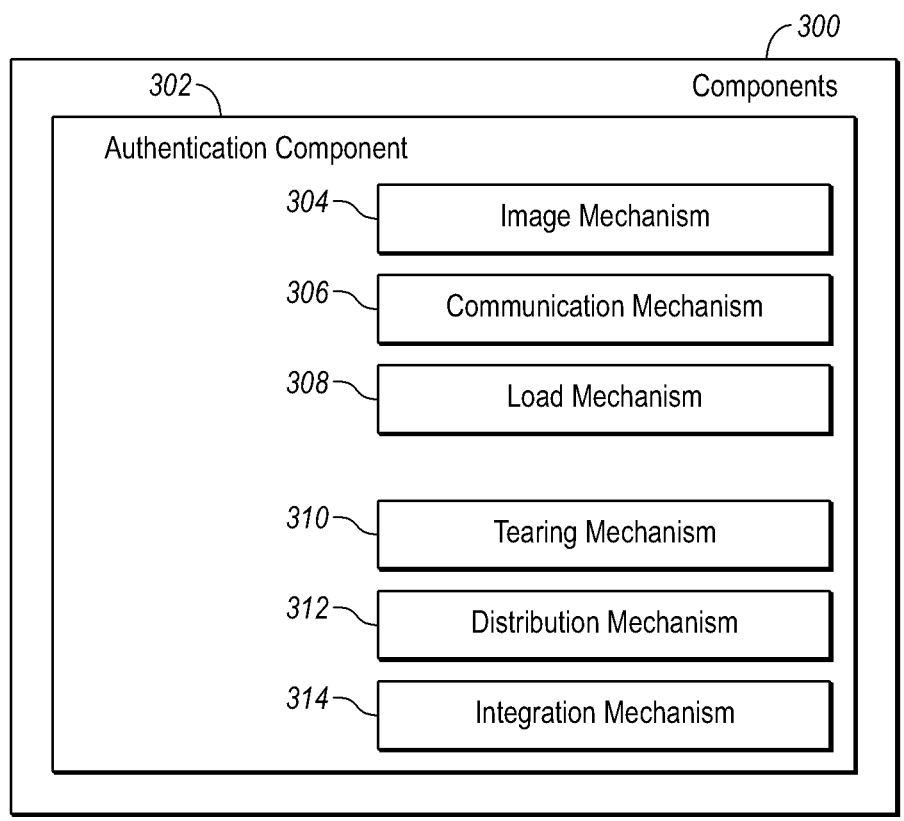
FIG. 3 shows a schematic of an illustrative example of components used in the authentication process.

FIG. 3 shows a schematic of an illustrative example of components 300 used in the authentication process. The components 300 are an example of the components 116 and/or 152. The components 300 or any portion thereof can be implemented on a device, such as the devices 110 and 120, and/or on a server, for example the server 150. Specifically, FIG. 3 illustrates an authentication component 302, which is an example of the authentication component 252.

The authentication component 302 may be partially implemented on the device 110 and partially implemented on the server 150. In some examples, the authentication component 302 may only be implemented on the server 150 or only on the devices 110 and 120. One of skill in the art, with the benefit of the present disclosure, can appreciate that the component 300 can be distributed in many different configurations among one or more devices and/or one or more servers.

In one example, the authentication component 302 may include a number of different mechanisms to build an authentication system and/or authenticate the devices or users that participate in the authentication system. Some of the mechanisms may be used in constructing the authentication system while other mechanisms may be used during authentication. As previously described, some of the mechanisms may be implemented on a device while other mechanisms may be implemented on a server.

In this example, the authentication component 302 may include an image mechanism 304, a communication mechanism 306, a load mechanism 308, a tearing mechanism 310, a distribution mechanism 312, and an integration mechanism 314. The authentication component 302 may be configured to interact with corresponding authentication components on other devices or servers to build an authentication system. The authentication component 302 may also be configured to interact with corresponding authentication components on other devices or server participating in the authentication process during authentication of the participants.

The image mechanism 304 may be configured to acquire an image, such as the image 160. The image mechanism 304 may interact with the camera 264 to take the image 160 used in the authentication. The image mechanism 304 may alternatively interact with the server 150 and/or the database 154 to retrieve the image 160 and/or pieces of the image 160.

The communication mechanism 306 may be configured to establish communication with other devices and/or servers. The communication mechanism 306 enables the image 160 to be shared with at least other devices or participants in the authentication process. The communication mechanism 306 may establish communication over local area networks, wide area networks, Bluetooth networks, cellular networks, the Internet or the like. In one example the communication mechanism 306 of one device cooperates with the communication mechanism 306 of another device to share the image 160 and/or with a communication mechanism on the server 150. The communication can be continuous or conducted as needed while building the authentication system and/or when authenticating the participants in the authentication system.

The load mechanism 308 may be configured to determine a load value for the device. When building an authentication system, the load mechanism 308 of each device typically determines the load value for the respective device. The load mechanism 308 may also be configured to obtain load conditions from the GPS 258 and/or the accelerometer 260. The load mechanism 308 can determine the load values that are used to determine how the image is virtually torn from the load conditions. For example, the GPS 258 can provide both an initial location of the device 210 and a final location of the device 210 after movement. The change in location or the distance between these two locations combined with the acceleration experienced between these positions are examples of load conditions that can be used to determine a load value at each device for virtually tearing the image.

The load values of all devices participating in constructing the authentication system can be combined to virtually tear the image into pieces. The load values may be placed at random locations such that the resulting pieces are also random. For example, the load mechanism 308 of the server 150 or of one of the devices may use their communication mechanism 306 to receive load values from other participants in the authentication system.

The components may include a tearing mechanism 310 configured to tear the image into the appropriate number of pieces based on the load values. The tearing mechanism 310 operates to virtually tear the image 160 based on the load values. In other words, once the load values are received from all participants, the image 160 can be virtually torn or the database 154 can be accessed to retrieve a set of pieces associated with the image 160.

More specifically, the tearing mechanism 310 may conduct a simulation based on the load values or access the database 154 using the load values as a reference to retrieve a set of pieces from the database 154. When accessing the database 154, the images 156 may be indexed according to load values. The tearing mechanism 310 can thus virtually tear the image 160 into a specified number of pieces.

The tearing mechanism 310 may also be able to detect the number of users or devices participating in the authentication process in order to determine load points from the load values. For example, the number of users can be determined based solely on geographic locations of the devices participating in the authentication process. Devices that are within a predetermined distance of one another are the devices permitted to participate in the authentication and are the devices that will receive a piece of the image. The communication mechanism 206, however, may also register devices such that devices within the range but not participating in the authentication process are not included. In another example, only those devices that are using their authentication component are considered when determining the number of users/devices participating in the authentication process. In another example, a device that is remotely located from other device can also participate in the authentication process. In this example, the virtually tearing of the image 160 can be simulated and the load values of the remotely located device can be determined from movement of the device or randomly assigned to the remotely located device.

In one example, the load values are determined based on the accelerations determined at each device participating in the authentication process. The acceleration data can be transferred to the server 150 and the server 150 may simulate the process of tearing the image 160 using the accelerations determined at the participating devices. The image 160 is virtually torn in this matter.

The results of the simulation may include real data, which is a table or database generated from a real experiment of tearing the image and computer simulation data, which may be data generated through a finite element method.

A distribution mechanism 312 may be configured to distribute the resulting pieces of the virtually torn image to each of the devices participating in the authentication system. The distribution mechanism 312 is used to distribute the pieces of the image 160. This may be done by request from one of the devices, for example, during the authentication process. The distribution mechanism 312 may also be able to store an image taken by one of the devices in a piece of paper and also supports texture mapping.

Generally, texture mapping relates to applying an image to a surface of an object. In one embodiment, texture mapping includes placing an image on the geometry of an object. In embodiments of the disclosure, texture mapping can apply the image 160 to the surface of paper or to the surface of another object before being virtually torn. Embodiments contemplate texture mapping before and/or after the image 160 is virtually torn. In some embodiments, texture mapping may not be performed.

Texture mapping may be used when applying or pasting the image 160 selected by one of the participants to data generated from real experiments that were not simulated. Texture mapping can be used when comparing the number and density of the texture generated through the texture mapping. In this sense, the texture mapping can be one of the parameters used in determining whether or not the pieces of the image can be successfully joined and authenticated. The processing parameters of texture mapping can be used as a standard and if the calculated texture of the joined image is different from the original standard, then the image may not be authenticated.

An integration mechanism 314 may be configured to determine whether pieces of the image received from other devices and/or servers can be joined to form the image that was originally used to build the authentication system. The integration mechanism 314 may be used during authentication and can integrate or join the pieces of the image uploaded by the devices during authentication of the participants. The integration mechanism 314 may be able to compare the joined pieces with a template image to determine a degree of coincidence. The integration mechanism 314 may also be able to determine a degree of continuity between different pieces in the joined image without comparing the joined pieces to a template. For example, the integration mechanism may assume that the image has a generally rectangular shape and attempt to assemble the pieces accordingly. Because each piece of the image is likely to include an edge of the perimeter, the process of joining the images can be more quickly performed.

The following discussion identifies examples for determining whether the pieces of an image are successfully joined. Typically, the edges of the pieces are joined using any suitable manner. In one example, the joined image is compared with the original or template image. The elements of joining the edges can be repeated until an image distance is above a predetermined threshold. The image distance determines how well the pieces fit together.

In another example, a geometrical value can then be determined for the joined image, such as a tangent of a straight line or a curvature of a curve. If the geometrical value is within an error range, the joining of the pieces is successful.

In another example, a circumference, a number of an acute angle, and a degree of the acute angle of the joined image is determined. This can be repeated until a determined image distance reaches a threshold, at which point the image is successfully joined.

In another example, a curvature of the joined edges is determined. For instance, the length of an edge, the inclination of the edge, and/or a curve point of the edge of the joined image can be determined. If the curvature is within an error range, the joining is deemed to be successful.

In another example, an RMS approximate curve is determined (straight line, n-dimension spline curve) for an edge outline of each piece. The coefficients of the approximate curve can be compared with the coefficients of a similar curve for the original image. The coefficients for the original curve can be determined using the load values and based on how the original image was virtually torn. If the difference is within a predetermined error threshold, then the joined image is deemed successfully joined.

In another example, a number, density, and a statistical distribution of the texture mapping is determined for each piece of the image. These values are compared to a determined value and the pieces of the image are successfully joined when these values are similar to a predetermined threshold.

The mechanisms 304, 306, 308, 310, 312, and 314, by way of example only, cooperate to create or construct an authentication system and/or authenticate the devices or users at the appropriate time.

Figure 4:
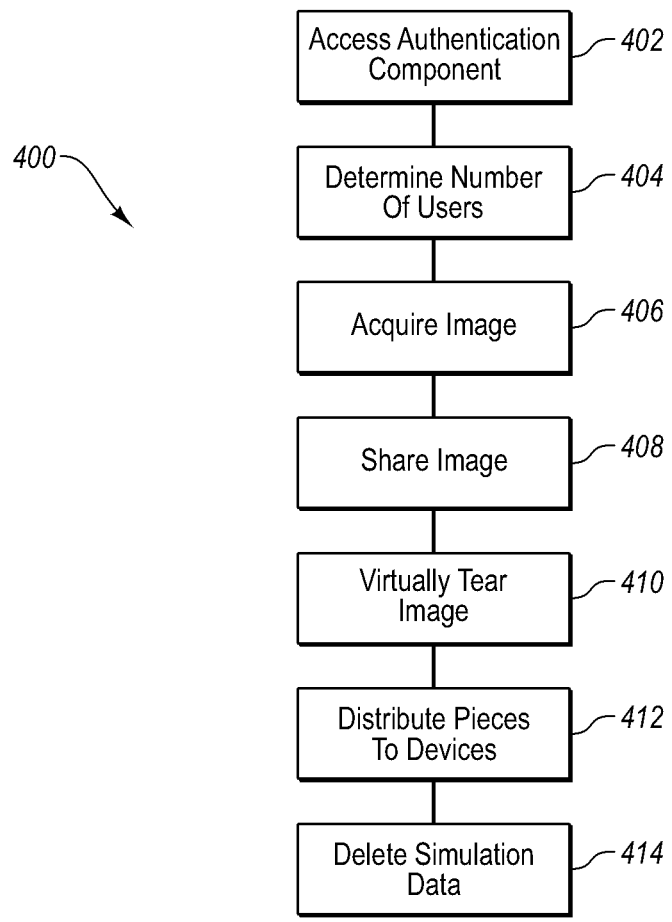
FIG. 4 shows an illustrative example of a method for constructing an authentication system.

FIG. 4 shows an illustrative example of a method 400 for constructing an authentication system. In box 402 ("Access Authentication Component"), each device participating in the authentication process accesses its authentication component. In box 404 ("Determine Number of Users"), the number of devices participating in the authentication process is determined The number of users can be determined from the number of devices that are in the same or substantially the same location or that have accessed their authentication component or that have registered with a server, or the like. The number of users can be determined based on information collected from the GPS sensors of the devices. The number of devices (or more generally participants in the authentication process) determines the number of pieces that result from virtually tearing the image. The device that acquires the image may perform the task of identifying the number of devices or participants in the authentication process. Alternatively, the server may identify the number of participants.

In box 406 ("Acquire Image"), an image is acquired by one of the devices. The image can be acquired using a camera of the device or from a database of images that have already been prepared for use in an authentication system. In box 408 ("Share Image"), the acquired image is shared with the other devices. In one example, each of the devices may display at least a portion of the image. In some instances, the image displayed may rotate or be displayed in another manner.

In box 410 ("Virtually Tear Image"), the shared image is virtually torn. In this example, the devices participating in the authentication process are pulled away from each other at the appropriate time (e.g., when instructed, upon agreement among the users, at a time determined by one of the devices, etc.). The movement (e.g., acceleration and/or change in location) of the devices is used to determine load values. The load values are used to simulate the virtual tearing of the image or access a database. If a device is unable to provide load values, the load values may be selected at random for that device.

In box 412 ("Distribute Pieces to Devices"), the pieces of the image are distributed to the devices participating in the authentication process. Each of the devices receives one of the pieces. The pieces can be distributed, by way of example only, randomly or based on where the corresponding load value of the device was applied to the image. Each device thus receives the piece corresponding to where its load value was applied during the tearing simulation in one example.

In box 414 ("Delete Simulation Data"), the simulation data, which may include some image data, is deleted from each of the devices. In this manner, each device only retains one of the pieces of the image with no knowledge or data of how the image was virtually torn.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
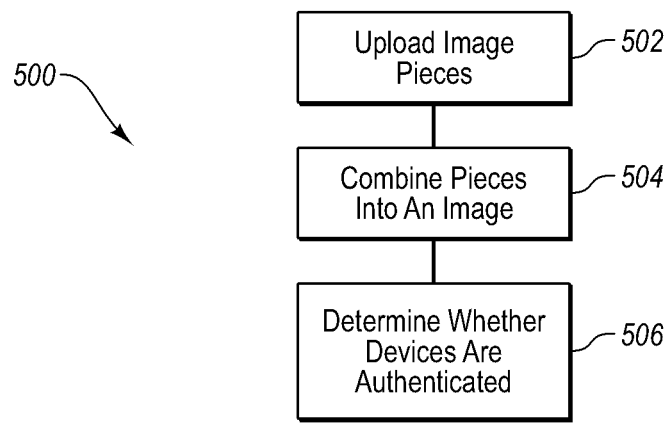
FIG. 5 shows an illustrative example of a method for authenticating devices in an authentication system.

FIG. 5 shows an illustrative example of a method 500 for authenticating devices in an authentication system. The method 500 typically occurs after the authentication system has been constructed. In box 502 ("Upload Image Pieces"), pieces of the image are uploaded. The devices participating in the authentication upload their pieces to a server or to one of the other devices.

In box 504 ("Combine Pieces into an Image"), the pieces are combined into an image. The pieces can be joined by determining how the edges of the pieces fit together. The authentication component (whether operating on one of the devices or on a server) can rearrange the pieces in order to determine if the pieces fit together or can be joined to form the original image. If the pieces fit together within an allowed degree of coincidence, then the devices are authenticated in box 506 ("Determine whether Devices are Authenticated"). Alternatively, if the joined pieces match an original image taken or acquired during the construction of the authentication system, then the devices are authenticated. If the pieces can be joined to form the original image that was virtually torn during construction of the authentication system, then the devices and/or associated users are authenticated. Devices or participants whose pieces cannot be joined to the image are rejected and are not authenticated.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Figure 6:
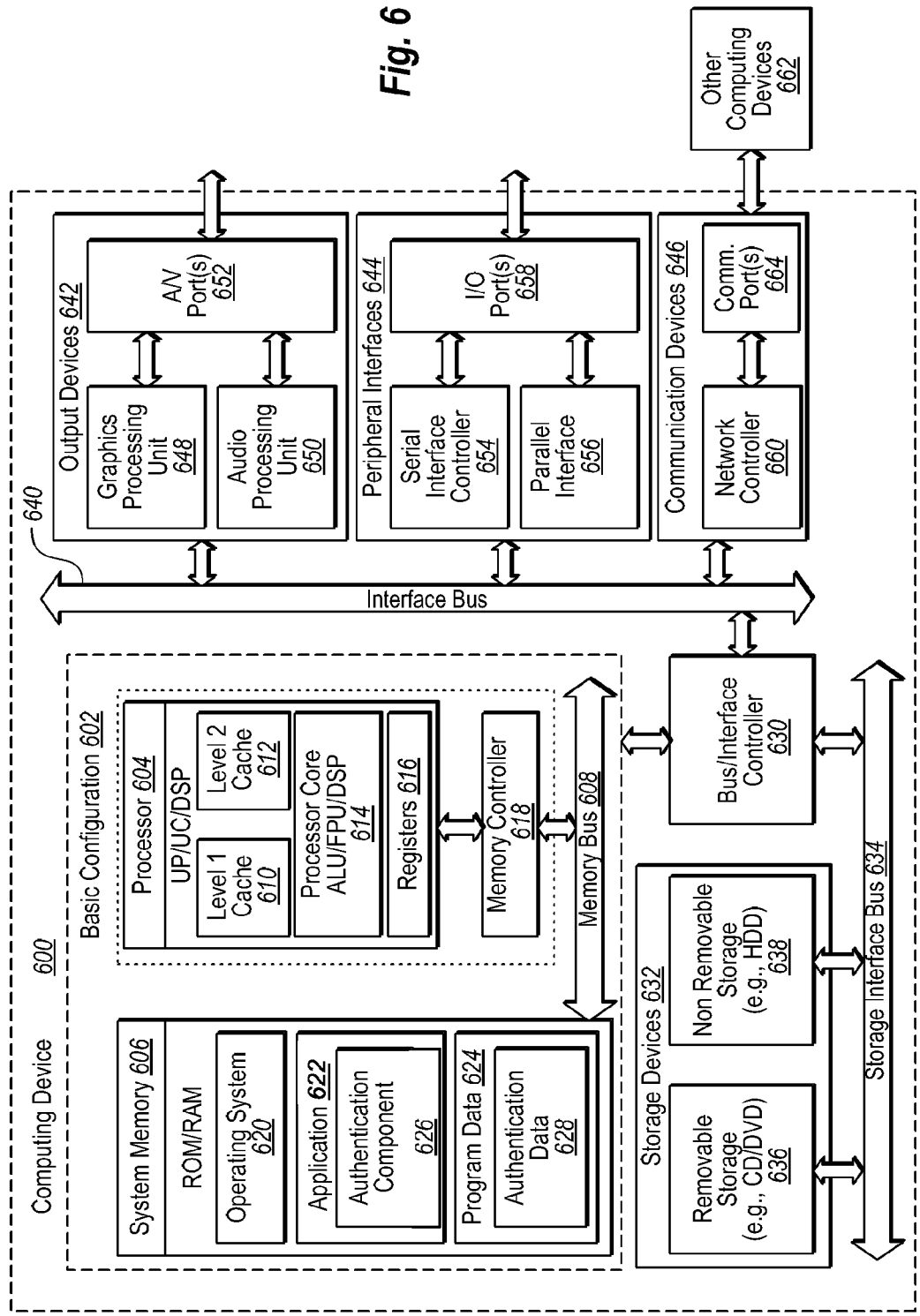
FIG. 6 depicts a block diagram illustrating an example computing device that is arranged to implement construction of an authentication system and/or authentication of one or more devices or users, arranged in accordance with some embodiments of the present disclosure.

FIG. 6 depicts a block diagram illustrating an example computing device 600 that is arranged to implement construction of an authentication system and/or authentication of one or more devices or users, arranged in accordance with some embodiments of the present disclosure. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include an authentication component or application 626 that is arranged or configured to construct an authentication system or authenticate one or more devices or users. Program data 624 may include authentication data 628 for constructing an authentication system and/or authenticating one or more devices or users. In some embodiments, application 622 may be arranged to operate with program data 624 on operating system 620 such that an authentication system is generated. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 660, which may be configured to communicate to various external devices such as a display or speakers via one or more A/V ports 662. Example peripheral interfaces 644 include a serial interface controller 664 or a parallel interface controller 666, which may be configured to communicate with external devices such as input devices (e.g., keyboard, mouse, pen, voice input device, touch input device, etc.) or other peripheral devices (e.g., printer, scanner, etc.) via one or more I/O ports 668. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to authenticate users, the method comprising:
   acquiring an image in a first device associated with a first user;
   sharing at least a portion of the image with a second device associated with a second user;
   determining a first position of the first device with a global positioning device of the first device;
   determining a first acceleration of the first device as the image is virtually torn;
   generating a first load value using at least the first position or the first acceleration;
   determining a second position of the second device with a global positioning device of the second device;
   determining a second acceleration of the second device as the image is virtually torn;
   generating a second load value using at least the second position or the second acceleration, wherein:
      the first and second load values are used to virtually tear the at least the portion of the image to generate a first piece and a second piece by movement of one or both of the first device and the second device; and
      the first piece of the image is stored in the first device and the second piece of the image is stored in the second device; and
   authenticating the first device and the second device in response to the first piece and the second piece of the image being joined to form the image.

2. The method of claim 1, wherein acquiring the image in the first device comprises retrieving the image from a database of images.

3. The method of claim 1, wherein acquiring the image in the first device comprises acquiring the image using an image generation device of the first device.

4. The method of claim 1, wherein sharing at least the portion of the image with at least the second device comprises sending at least the portion of the image to the second device.

5. The method of claim 1, wherein to virtually tear the image into at least the first piece and the second piece, the method further comprises:
simulating the virtual tearing of the image based on the first load value and the second load value, wherein the first load value and the second load value are determined using at least one of relative positions or accelerations of the first device and the second device, and wherein the first load value is associated with the first device and the second load value is associated with the second device.

6. The method of claim 1, wherein to virtually tear the image into at least the first piece and the second piece, the method further comprises accessing a database to obtain the first piece and the second piece.

7. The method of claim 1, wherein authenticating the first device and the second device comprises:
uploading the first piece of the image to a server;
uploading the second piece of the image to the server; and
determining, by the server, whether the first piece and the second piece can be joined to form the image,
wherein the first device and the second device are authenticated in response to the first piece being successfully joined with the second piece.

8. A system to enable authentication in an authentication process, the system comprising:
a server configured to communicate with a plurality of participants, wherein the server includes an authentication component, and wherein the authentication component is configured to:
receive load values from the plurality of participants, wherein the load values include:
a first load value generated by a first device associated with a first one of the plurality of participants, wherein the first load value is generated using at least a first position of the first device determined by a global positioning device of the first device or using a first acceleration of the first device as an image is virtually torn; and
a second load value generated by a second device associated with a second one of the plurality of participants, wherein the second load value is generated using at least a second position of the second device determined by a global positioning device of the second device or using a second acceleration of the second device as the image is virtually torn;
virtually tear the image into multiple pieces based on the load values that indicate movement of at least the first one of the plurality of participants and the second one of the plurality of participants;
distribute a piece of the image to each of the plurality of participants; and
integrate pieces of the image uploaded by the plurality of participants to authenticate the plurality of participants.

9. The system of claim 8, wherein the authentication component is configured to authenticate the plurality of participants if the uploaded pieces can be joined to form the image and wherein the authentication component is configured to reject participants whose pieces cannot be joined to form the image.

10. The system of claim 8, wherein the authentication component is configured to receive the load values from each participant, the load values determined from accelerometer data captured when the image is virtually torn by movement of the corresponding participant and location data from the corresponding participant.

11. The system of claim 8, wherein the authentication component is configured to virtually tear the image into multiple pieces by use of a database of image sets, each image set including a complete set of pieces corresponding to a virtually torn image.

12. The system of claim 8, wherein the authentication component is configured to provide texture mapping to integrate the pieces of the image.

13. The system of claim 8, wherein the authentication component is configured to receive the pieces of the image uploaded by the plurality of participants during authentication of the plurality of participants.

14. The system of claim 8, wherein the load values are randomly generated for at least one of the participants.

15. A device to participate in an authentication system, the device comprising:
a global positioning device configured to determine a first position of the device, wherein a second device in the authentication system comprises a second global positioning device configured to determine a second position of the second device;
an accelerometer configured to determine a first acceleration of the device as an image is torn, wherein the second device comprises a second accelerometer configured to determine a second acceleration of the second device as the image is torn; and
an authentication component configured to interact with corresponding authentication components on the second device, other devices, and/or servers to build the authentication system, the authentication component of the device comprising:
an image mechanism configured to acquire an image;
a communication mechanism configured to establish communication with the second device, the other devices, and/or the servers;
a load mechanism configured to generate a first load value indicative of movement of the device using at least the first position or the first acceleration, wherein the second device comprises a second load mechanism configured to generate a second load value indicative of movement of the second device using at least the second position or the second acceleration;
a tearer mechanism configured to virtually tear the image based on the first load value indicative of movement of the device and the second load value indicative of movement of the second device into multiple pieces; and
a distribution mechanism configured to distribute one of the multiple pieces of the image to the second device and each of the other devices that participate in the authentication system.

16. The device of claim 15, wherein the authentication component further comprises an integration mechanism configured to determine whether pieces of the image received from the second device, the other devices, and/or the servers can be joined to form the image.

17. The device of claim 15, wherein the image mechanism is configured to acquire the image by capture of the image with an image generation device or retrieval of the image and the multiple pieces from a database.

18. The device of claim 15, wherein the tearer mechanism is configured to conduct a simulation of a virtual tear of the image based on load values of the devices that participate in the authentication system.

19. The device of claim 15, wherein the tearer mechanism is further configured to virtually tear the image based on load values received from the other devices that participate in the authentication system and wherein the load values are determined from at least one of location data and acceleration data generated by the other devices that participate in the authentication system.

* * * * *

UNITED STATES PATENT AND TRADEMARK OFFICE
CERTIFICATE OF CORRECTION

| | | |
|---|---|---|
| PATENT NO. | : 8,813,184 B2 | Page 1 of 1 |
| APPLICATION NO. | : 13/260154 | |
| DATED | : August 19, 2014 | |
| INVENTOR(S) | : Hirose | |

It is certified that error appears in the above-identified patent and that said Letters Patent is hereby corrected as shown below:

In the Drawings,

In Fig. 6, Sheet 5 of 5, below "Processor 604", Line 1, delete "UP/UC/DSP" and insert -- µP/µC/DSP --, therefor.

In the Specification,

In Column 7, Line 33, delete "torn occur" and insert -- torn --, therefor.

In Column 12, Lines 47-48, delete "determined The" and insert -- determined. The --, therefor.

Signed and Sealed this
Sixteenth Day of December, 2014

Michelle K. Lee
*Deputy Director of the United States Patent and Trademark Office*